United States Patent [19]

Cassidy et al.

[11] Patent Number: 5,625,887
[45] Date of Patent: Apr. 29, 1997

[54] METHOD FOR NON-REGISTERED COMMUNICATION UNITS TO ACCESS A COMMUNICATION SYSTEM

[75] Inventors: Lizabeth A. Cassidy, Fox River Grove; Daniel J. McDonald, Cary; Herbert R. Wolf, Elk Grove Village, all of Ill.

[73] Assignee: Motorola, Inc., Schaumburg, Ill.

[21] Appl. No.: 434,172

[22] Filed: May 1, 1995

Related U.S. Application Data

[63] Continuation of Ser. No. 983,198, Nov. 30, 1992, abandoned.

[51] Int. Cl.$^6$ .................................................. H04Q 7/38
[52] U.S. Cl. ...................... 455/54.2; 455/33.2; 455/56.1; 379/60
[58] Field of Search .................... 455/54.1, 54.2, 455/53.1, 56.1, 33.1, 33.2, 34.1; 379/59, 60

[56] References Cited

U.S. PATENT DOCUMENTS

| | | | |
|---|---|---|---|
| 4,723,264 | 2/1988 | Sasuta et al. | 455/54.2 |
| 4,833,701 | 5/1989 | Comroe et al. | 455/33.2 |
| 4,876,738 | 10/1989 | Selby | 455/33.2 |
| 5,159,625 | 10/1992 | Zicker | 455/33.2 |
| 5,210,787 | 5/1993 | Hayes et al. | 455/33.2 |

*Primary Examiner*—Reinhard J. Eisenzopf
*Assistant Examiner*—Thanh Le
*Attorney, Agent, or Firm*—James A. Coffing; George C. Pappas

[57] ABSTRACT

A method for a non-registered communication unit to access a communication system consists of sending a service request. Upon receiving a service request, the communication resource allocator assigns an entry in the communication system database to the non-registered unit and assigns system default features to the entry such that the unit has default access to the communication system. Thus allowing a communication unit that has subscribed to system services and has not been recognized by the system manager to access the system utilizing default parameters until the system manages properly registers the unit.

3 Claims, 3 Drawing Sheets

1

METHOD FOR NON-REGISTERED COMMUNICATION UNITS TO ACCESS A COMMUNICATION SYSTEM

This is a continuation of application Ser. No. 07/983,198, filed Nov. 30, 1992 and now abandoned.

FIELD OF THE INVENTION

This invention relates generally to communication systems and, in particular, to accessing a communication system by non-registered communication units.

BACKGROUND OF THE INVENTION

Communication systems, such as trunked communication systems and conventional communication systems, are known to comprise a plurality of communication units, a limited number of communication resources that are transceived by a predetermined number of repeaters and a communication resource allocator. Of the communication resources, one is selected as a control channel to transceive system data between the communication units and the communication resource controller, where the communication resources may be frequency carriers, pairs of frequency carriers, time division multiplexing (TDM) slots, or any other radio frequency (RF) transmission medium. The communication units may be vehicle, portable, cellular radios and/or telephones and may be arranged into communication groups.

Typically, in order for a non-registered communication unit to access a communication system, it must first be registered with the system. A non-registered communication unit is one that has not been acknowledged by the system manager. For example, a non-registered communication unit may be one that is new, such that it has never registered to any system or it may have just subscribed to a new service that now allows the unit to access the system. In either case, the system manager was not aware of the communication unit and it is therefore regarded as non-registered.

Typically, in prior art systems, the system manager registers the non-registered communication unit within a communication system database which may be located in the communication resource allocator. Registration of a communication unit comprises assigning an entry in the communication system database, wherein, the entry contains identification information of the unit and indicates the system features that the user has subscribed to and is entitled to access (i.e. registration information). These features may include private calling, group calling, roaming, telephone access, paging, emergency, etc.

Although such prior art systems are suitable for communication units once they are registered, it does not provide system access for non-registered communication units that should be registered but for whatever reason are not. Typically, to accommodate such a non-registered communication unit, the system manager must manually assign an entry to the unit in the system database. Furthermore, in the event of database loss, new system start up, or the addition of new communication units, the system manager must manually enter the communication unit's registration information into the database before system access can be granted. The manual entry of user registration information is both time consuming and cumbersome. Therefore, a need exists for a method that automatically permits limited system access to a non-registered communication unit until it can be registered.

DESCRIPTION OF A PREFERRED EMBODIMENT

In general, this invention allows non-registered communication units, which are units that have not been acknowledged by the system manager, to temporarily access a communication system until they can be registered and their subscriber system features enabled. A non-registered communication unit may attempt to access the communication system by sending a service request. When the communication system receives the service request, the communication resource allocator will temporarily assign an entry, if one is available, in a communication system database to the non-registered communication unit. The communication resource allocator will assign system default features to the temporary entry such that the non-registered unit is permitted default access to the communication system.

Figure 1:
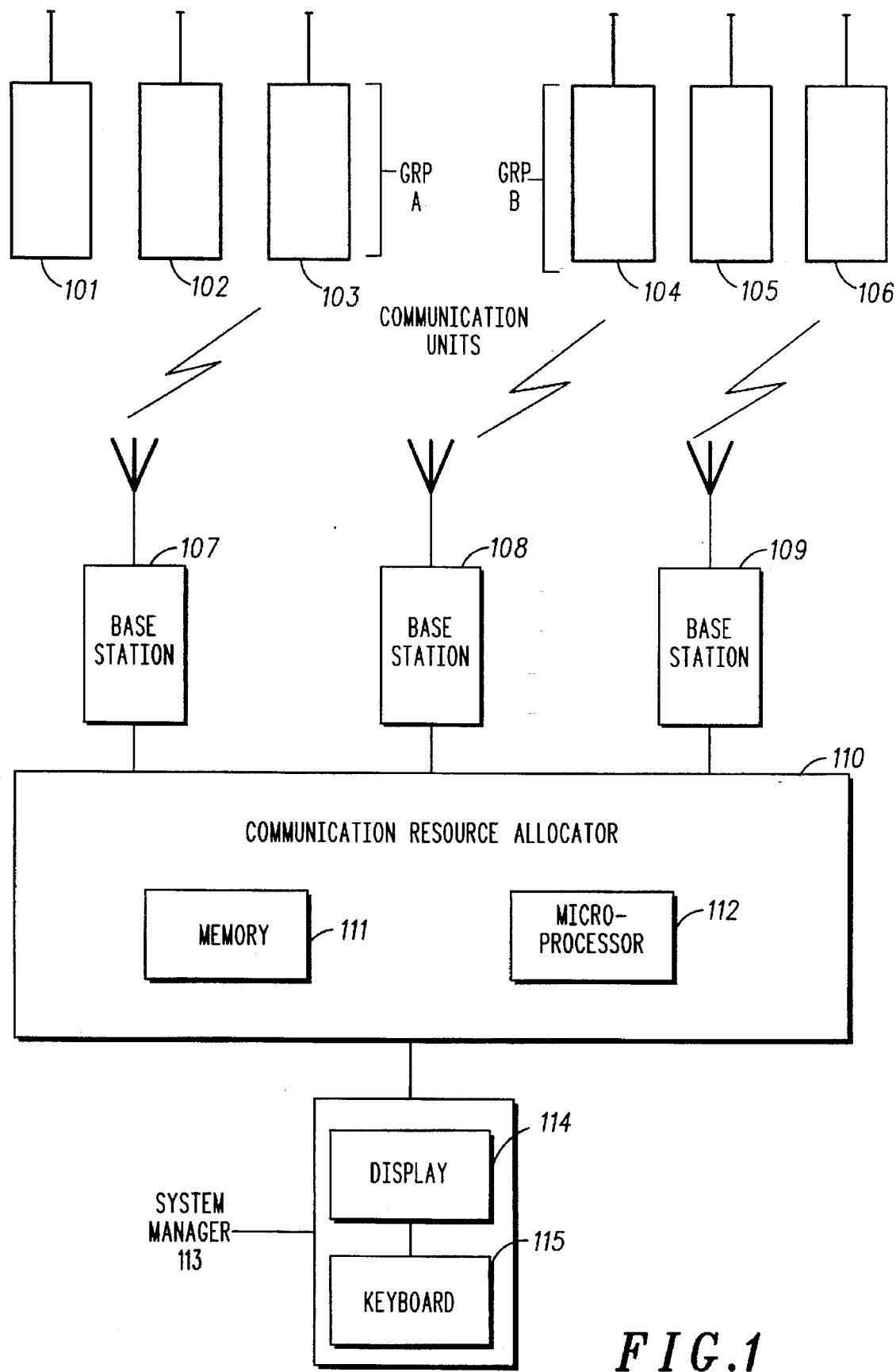
FIG. 1 illustrates a block diagram depicting a communication system in accordance with the invention.

The present invention can be more fully described with reference to FIG. 1, FIG. 2, and FIG. 3. FIG. 1 illustrates a communication system that includes a plurality of communication units 101–106, a communication resource allocator 110, a system manager 113, and a limited number of communication resources transceived by base stations 107–109. The communication units are divided into communication group A 101–103 and communication group B 104–106 where the units may be vehicle, portable, cellular radios and/or telephones. The communication resource allocator 110 includes a memory 111 and a microprocessor 112, wherein, the memory 111 may be RAM, ROM or any digital information storage device. The database, located within the memory 111, contains temporary entries for non-registered units and fixed entries for registered units. The system manager 113 is made up of a display 114 and a keyboard 115 which is used to enter registration information of communications unit into the database. The structure and function of the system manager is known in the art thus no further discussion will be presented except to facilitate the understanding of the present invention.

Figure 2:
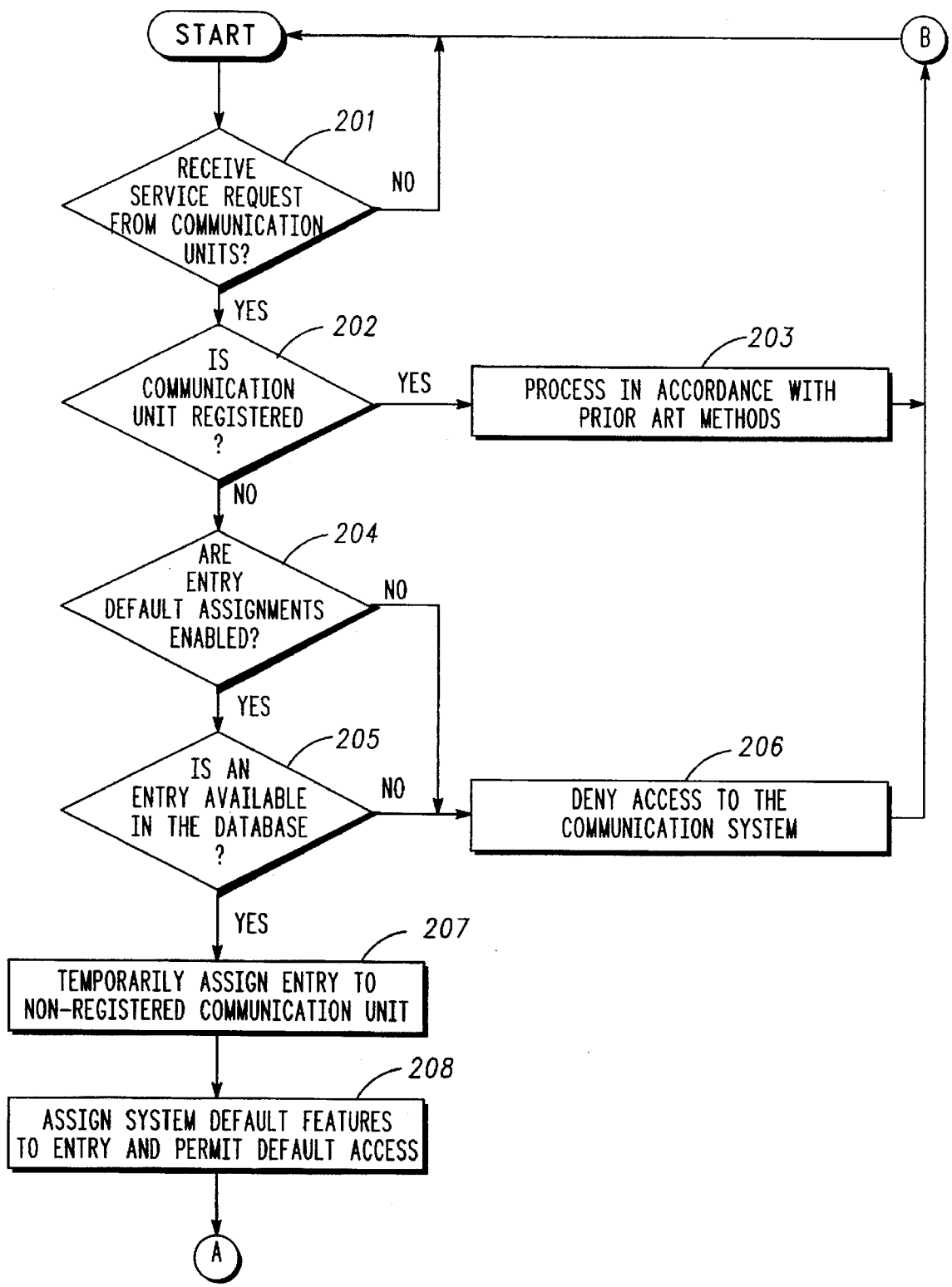
FIG. 2 and FIG. 3 illustrate flowcharts that a communication system may employ to implement the present invention.
Figure 3:
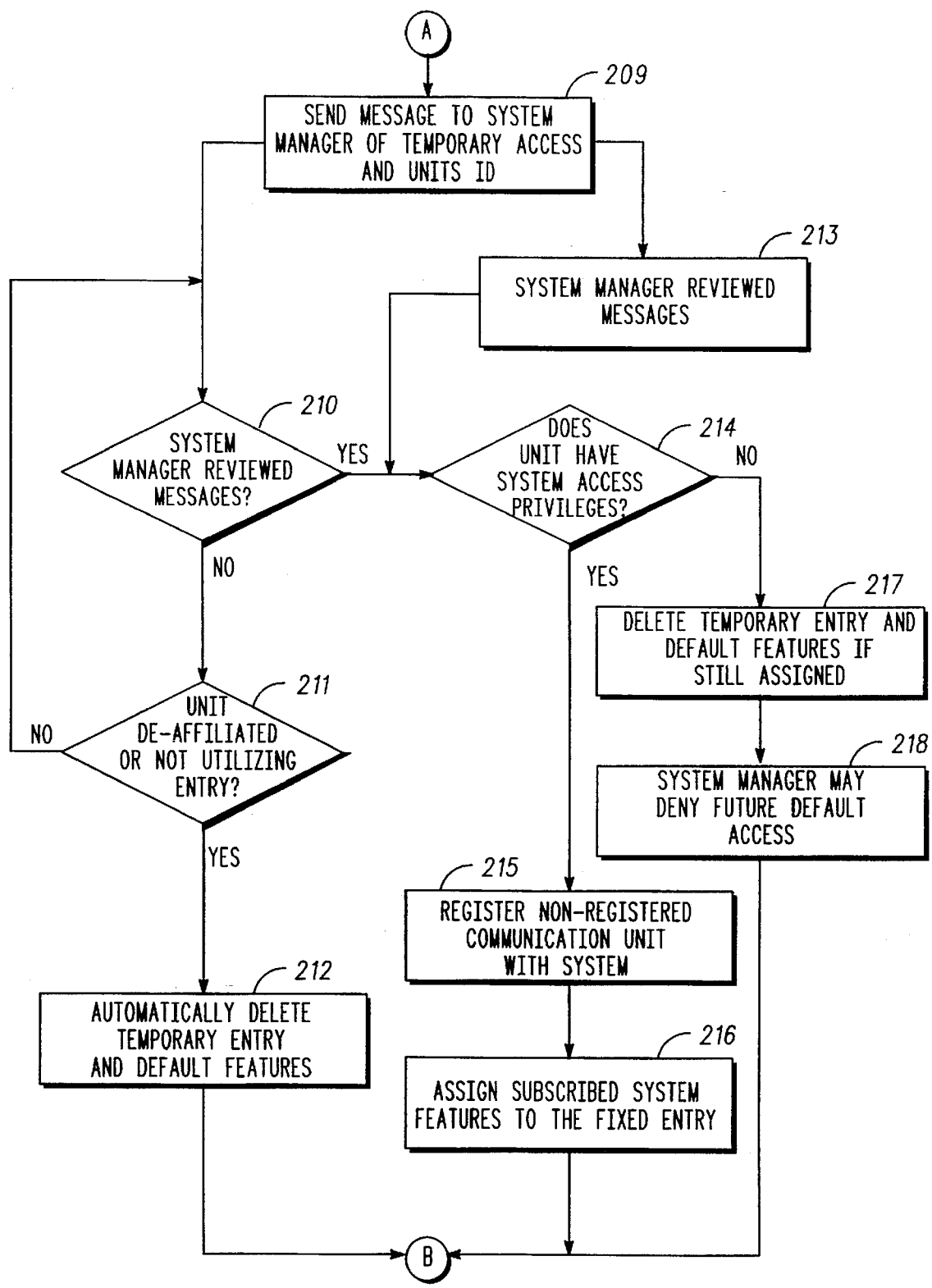

FIG. 2 and FIG. 3 illustrate a logic diagram which the microprocessor of the communication resource allocator may execute to perform the present invention. The communication resource allocator may require additional memory and/or processing capabilities, however, it is contemplated that existing memory and processing circuits will suffice.

In FIG. 2 and FIG. 3, the communication system may receive a service request from a communication unit attempting to access the communication system 201. If the communication unit is registered 202, the communication system acknowledges the unit and processes the request in accordance with prior art methods 203. If the communication unit is not registered 202, the communication system determines whether the entry default assignments are enabled 204.

Entry default assignments are the means by which the communication system permits system access by non-registered communication units and are controlled by the system manager. The system manager has the ability to enable or disable entry default assignments by setting a flag high or low in the communication resource allocator, which is read each time a non-registered communication unit requests access. The flag may be set such that temporary entry assignments are enabled or disabled on a global basis, which would permit temporary entry assignments to all or none of the non-registered communication units requesting service. The system manager may also set the flag to enable or disable entry default assignments based upon individual ID or group ID, therefore, permitting or denying temporary entry assignments to non-registered communication units based on individual ID or group ID.

If the entry default assignments are not enabled 204, the non-registered communication unit is denied access to the system 206. If the entry default assignments are enabled 204, the communication resource allocator determines whether there is an available entry in the communication system database 205. If an entry is not available in the communication system database 205, non-registered communication units are denied access to the system 206.

If an entry is available in the user database 205, temporarily assign an entry to the non-registered communication unit 207. The communication resource allocator assigns system default features to the temporary entry and permits system default access 208. System default features, which are selected subscriber system features, are features that the communication system may permit the non-registered communication unit to access. The subscriber system features may include private call, group call, roaming, telephone access, paging, emergency call, etc. System default features may be assigned globally, to all temporary entries, or may assigned based on individual ID or group ID. In the case of group ID, the unit may by permitted to access the features the group has subscribed to. For example, group A may have private call, group call, and roaming while group B may have group call, paging, and telephone access, such that if the non-registered unit is a member of group A he may have access to private call, group call, and roaming.

When a non-registered communication unit is permitted system default access 208, a default access activity message is sent to the system manager for subsequent review 209. The default access activity message states that default access was permitted to a non-registered communication unit and includes the unit ID. The system manager might not have reviewed the activity message at the same time a non-registered unit has temporary access to the system, but eventually the system manager will review the message 213. If the system manager has not reviewed the activity messages 210, has the non-registered communication unit sent a de-affiliation request or is the unit not utilizing the entry 2117? If the non-registered unit has transmitted a de-affiliation request or is not utilizing the entry 211, the communication resource allocator will automatically delete the temporary entry and default features 212. This unit may attempt to re-access the communication system by sending a service request, beginning the process over again at step 201 (FIG. 2).

If the non-registered communication unit has not sent a de-affiliation request and is utilizing the entry 211, has the system manager reviewed the activity messages 210? If the system manager has reviewed the activity messages for the non-registered communication unit of step 210 or 213, does the non-registered communication unit have system access privileges 214? The system manager can determine if a non-registered communication unit has system access privileges by (manually) searching for the non-registered units ID in a list of individual and group subscriber IDs. If the non-registered unit is a subscriber and therefore has system access privileges 214, the system manager registers the communication unit with the communication system 215 and assigns the unit's subscribed system features to the fixed entry 216. This unit is now registered and future service requests will be processed in accordance with prior art, refer to START of FIG. 2.

If the non-registered communication unit does not have system access privileges 214, the system manager deletes the temporary entry containing default features, if still assigned 217. The system manager, knowing the non-registered communication unit's ID, may choose to deny future default access to the unit by setting a flag to disable entry default assignments for the unit 218. This unit may attempt to re-access the communication system by sending a service request, refer to START of FIG. 2, except now the unit may be denied access if the system manager disabled the entry default assignments for this particular unit.

As shown above, the present invention provides a method for non-registered communication units to temporarily access a communication system. Unlike prior art systems, this invention permits a communication unit that has subscribed to system services and has not been recognized by the system manager to access the system utilizing default parameters until the system manager properly registers the unit.

We claim:

1. In a communication system that includes a plurality of communication units, a limited number of communication resources that are transceived by a predetermined number of repeaters, and a communication resource allocator, a method for selectively allowing a non-registered communication unit default access to the communication system, the method comprising the steps of:

a) transmitting, by the non-registered communication unit, a service request;

b) upon receiving the service request, accessing by the communication resource allocator a user database to determine whether the non-registered communication unit is registered;

c) identifying, responsive to the step of accessing, whether an entry is available in the user database;

d) when there is an available entry in the user data base, temporarily assigning, by the communication resource allocator, the available entry to the non-registered communication unit to produce a temporary entry in the user data base;

e) when default entry assignments have been enabled, automatically assigning, by the communication resource al locator, temporary default system features to the non-registered communication unit such that the non-registered communication unit has default access to the communication system;

f) identifying, by the communication resource allocator, whether the non-registered communication unit has system access privileges; and g) when, the non-registered communication unit does not have system access privileges, denying future, default access to the communication system for the non-registered communication unit.

2. In the method of claim 1, step (e) further comprises assigning the default system features based on an individual identification code of the non-registered unit.

3. The method of claim 2, further comprising the step of automatically deleting, by the communication resource allocator, the temporary entry in the user database when the non-registered communication unit is not utilizing the entry in the user database.

\* \* \* \* \*